(12) United States Patent
Miyazawa

(10) Patent No.: US 10,321,058 B2
(45) Date of Patent: Jun. 11, 2019

(54) IMAGE PICKUP APPARATUS AND MOTION VECTOR DETECTION METHOD

(71) Applicant: CANON KABUSHIKI KAISHA, Tokyo (JP)

(72) Inventor: Hitoshi Miyazawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/659,819

(22) Filed: Jul. 26, 2017

(65) Prior Publication Data

US 2018/0063436 A1 Mar. 1, 2018

(30) Foreign Application Priority Data

Aug. 30, 2016 (JP) ................................ 2016-167908

(51) Int. Cl.
*H04N 5/232* (2006.01)

(52) U.S. Cl.
CPC ....... *H04N 5/23254* (2013.01); *H04N 5/2328* (2013.01); *H04N 5/23212* (2013.01); *H04N 5/23216* (2013.01); *H04N 5/23219* (2013.01); *H04N 5/23245* (2013.01); *H04N 5/23258* (2013.01); *H04N 5/23261* (2013.01); *H04N 5/23267* (2013.01); *H04N 5/23293* (2013.01); *H04N 5/23296* (2013.01)

(58) Field of Classification Search
CPC ........... H04N 5/23261; H04N 5/23287; H04N 5/23258; H04N 5/23254; H04N 5/23212; H04N 5/23296; H04N 5/23267; H04N 5/23216; H04N 5/23219; H04N 5/23245; H04N 5/2328; H04N 5/23293
See application file for complete search history.

(56) References Cited

U.S. PATENT DOCUMENTS

| 5,629,735 | A | * | 5/1997 | Kaneda | .............. | H04N 5/23212 |
| | | | | | | 348/345 |
| 7,773,145 | B2 | * | 8/2010 | Yamaguchi | ............ | G03B 13/36 |
| | | | | | | 348/169 |
| 8,692,888 | B2 | * | 4/2014 | Miyazaki | .......... | H04N 5/23219 |
| | | | | | | 348/169 |
| 8,704,908 | B1 | * | 4/2014 | Aldrich | .............. | H04N 5/23212 |
| | | | | | | 348/222.1 |
| 9,402,019 | B2 | * | 7/2016 | Yata | ........................ | G02B 7/36 |
| 2013/0163084 | A1 | * | 6/2013 | Miyazawa | ............. | G02B 27/64 |
| | | | | | | 359/554 |

FOREIGN PATENT DOCUMENTS

JP 2006-317848 A 11/2006

* cited by examiner

*Primary Examiner* — Lin Ye
*Assistant Examiner* — Chriss S Yoder, III
(74) *Attorney, Agent, or Firm* — Venable LLP

(57) ABSTRACT

An image pickup apparatus includes a detection unit which detects motion vectors between a plurality of captured images, a first setting unit which sets positions of a plurality of image regions used for motion vector detection by the detection unit, and a second setting unit which sets a target position of focus control. A result of detection by the detection unit is used for image blur correction. When the image pickup apparatus is in a first image blur correction mode, the first setting unit sets the positions of the plurality of image regions to be denser than when in a second image blur correction mode. When the image pickup apparatus is in the first image blur correction mode, the first setting unit sets the positions of the plurality of image regions according to the target position set by the second setting unit.

13 Claims, 7 Drawing Sheets

IMAGE PICKUP APPARATUS AND MOTION VECTOR DETECTION METHOD

BACKGROUND OF THE INVENTION

Field of the Invention

The present invention relates to an image pickup apparatus which detects motion vectors.

Description of the Related Art

Panning photography is an image capturing method with cameras. Panning photography is, for example, a method of capturing an image while making a camera follow a subject moving horizontally. In general, when a panning shot is taken, a shutter speed is slowed to generate a feeling of dynamic motion of a subject.

A lot of experience is necessary for a user to skillfully follow and capture a subject (for example, a train moving at a speed of 60 km/h) while swinging a camera with a slow shutter speed (for example, 1/30 second). It is especially difficult for beginners to match the speed of swinging a camera and the speed of a subject during a period of exposure with a slow shutter speed. Japanese Patent Laid-Open No. 2006-317848 discloses an image pickup apparatus which assists a panning shot by moving an optical axis shift lens such that a subject is frozen while performing image blur correction using an optical correction function.

For example, an image pickup apparatus having an image blur correction device for assisting panning shots drives a shift lens on the basis of a motion vector of a main subject detected in a captured image. This can compensate for both the difference between the speed of panning of the camera and the speed of the main subject (which corresponds to the amount of shaking of the subject) and the amount of shaking of the camera, thereby suppressing image blur of the main subject which is a target of the panning shot.

Known motion vector detection methods include a correlation method based on correlation calculation and a block matching method. For example, in the block matching method, an input image signal is divided into a plurality of appropriately-sized blocks (which are called vector detection blocks). Then, differences from pixels in a certain range of a previous frame are calculated for each block, and, then, a block of the previous frame which minimizes the sum of the absolute values of the differences is searched for. A relative displacement of the block between the screens indicates a motion vector of the block.

When prevention of shaking of the entire screen is desired, such as when a video shot is taken, it is desirable to arrange vector detection blocks over the entire screen. On the other hand, when prevention of shaking of a part of the entire screen is desired, such as when a panning shot is taken, it is desirable to arrange vector detection blocks densely at a location where prevention of shaking is desired. Furthermore, for panning shots, it is better to reduce the size of each vector detection block to improve the detection accuracy of motion vectors. However, when blocks are densely arranged over the entire screen, the processing time for motion vector detection increases and the amount of movement on an image plane increases, thereby increasing the amount of driving of the shift lens. In addition, when the vector detection blocks are densely arranged near the center of the screen, the motion vector of the subject which is a target of the panning shot cannot be detected and image blur correction for the subject cannot be performed with high accuracy if the subject is located at an edge of the screen such that the subject is not present within the range of vector detection blocks.

SUMMARY OF THE INVENTION

The present invention makes it possible to detect a motion vector of a subject at any position in a screen and to easily take panning shots.

An image pickup apparatus according to an embodiment of the present invention includes a memory and a processor configured to function, based on a program stored in the memory, as a detection unit configured to detect a motion vector between a plurality of captured images, a result of detection by the detection unit being used for image blur correction, a first setting unit configured to set positions of a plurality of image regions used for motion vector detection by the detection unit, and a second setting unit configured to set a target position of focus control, wherein the first setting unit is configured to set, when the image pickup apparatus is in a first image blur correction mode, the positions of the plurality of image regions to be denser than when the image pickup apparatus is a second image blur correction mode, and the first setting unit is configured to set, when the image pickup apparatus is in the first image blur correction mode, the positions of the plurality of image regions according to the target position set by the second setting unit.

Further features of the present invention will become apparent from the following description of exemplary embodiments with reference to the attached drawings.

DESCRIPTION OF THE EMBODIMENTS

Figure 1:
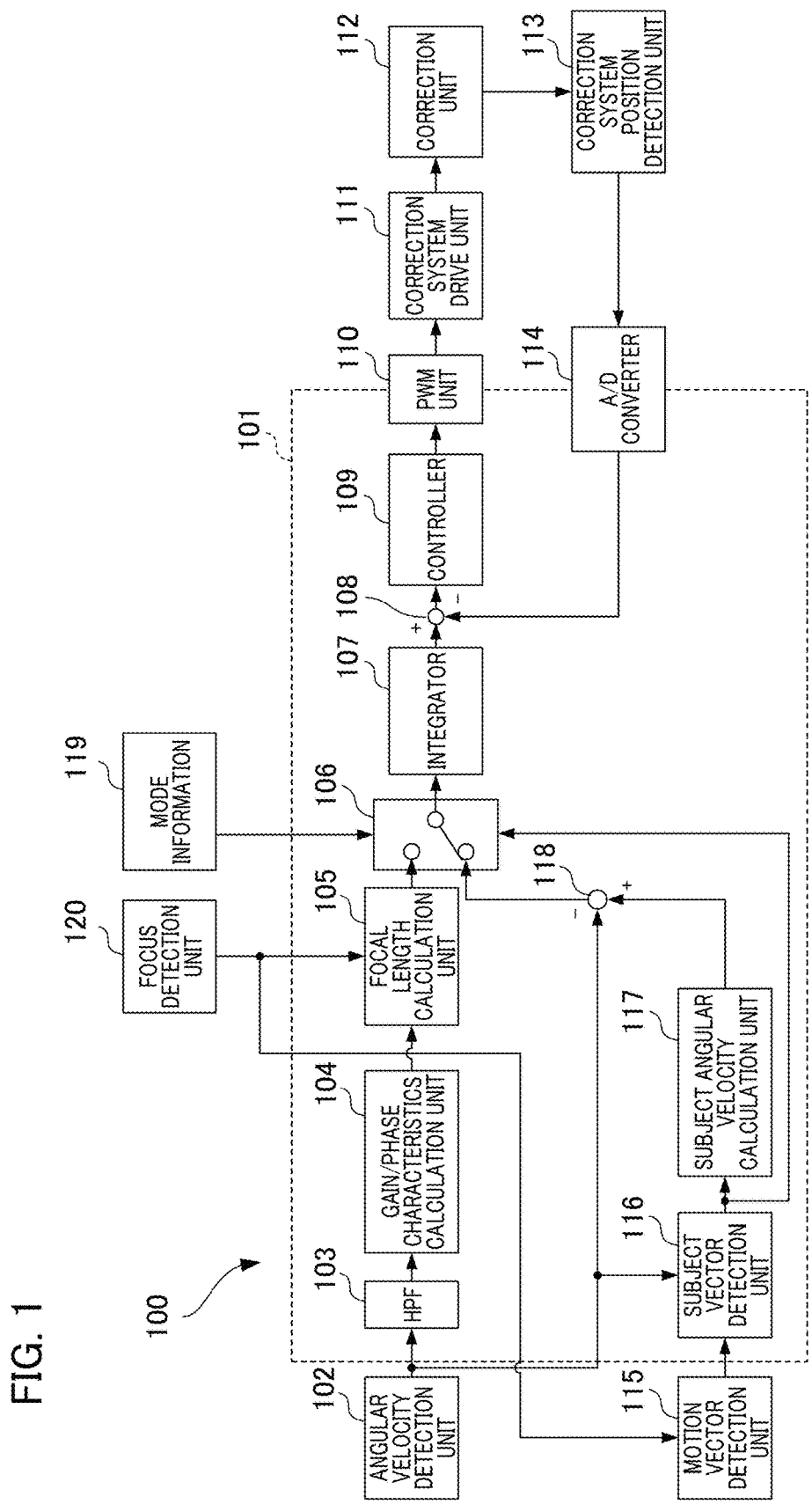
FIG. 1 is a diagram showing a configuration of an image pickup apparatus.

FIG. 1 is a diagram showing a configuration of an image pickup apparatus including an image blur correction device of the present embodiment.

In the following description, image blur correction control in one of a yaw direction or a pitch direction of an image is described. Descriptions of image blur correction control in the other direction will be omitted.

The image pickup apparatus shown in FIG. 1 is a digital camera. In an example shown in FIG. 1, the image pickup apparatus includes an image blur correction device 100, an angular velocity detection unit 102, a motion vector detection unit 115, a mode information input unit 119, a focus detection unit 120, a correction system drive unit 111, a correction unit 112, and a correction system position detection unit 113.

The angular velocity detection unit 102 detects a shake applied to the image pickup apparatus as an angular velocity signal (a shake detection signal). An output of the angular velocity detection unit 102 is provided as angular velocity data to a high-pass filter (hereinafter referred to as an HPF) 103 in a microcomputer (hereinafter referred to as a μCOM) 101.

The μCOM 101 realizes the image blur correction device 100. The μCOM 101 includes a plurality of the following elements from the HPF 103 to a subtractor 118. The HPF 103 has a function capable of changing frequency characteristics in an arbitrary frequency band. The HPF 103 cuts off low frequency components included in the angular velocity data and then outputs a signal of a high frequency band. The HPF 103 may also be configured to subtract, from the output of the angular velocity detection unit 102, a signal acquired by passing the output of the angular velocity detection unit 102 through a low-pass filter (LPF) which cuts off a signal of a high frequency band from the output of the angular velocity detection unit 102.

A gain/phase characteristics calculation unit 104 includes an amplifier that amplifies input data, which is the output of the high-pass filter, with a predetermined gain, and a phase compensation filter. A focal length calculation unit 105 receives a result of focus detection of an image capturing optical system from the focus detection unit 120, calculates a focal length thereof, and corrects the output of the gain/phase characteristics calculation unit 104 so that the output has an optimal value for driving the correction unit 112. A switch 106 selects a target signal for the correction unit 112. Specifically, the switch 106 switches between and outputs one of a target signal for subject shake correction and a target signal for camera shake correction according to mode information output by the mode information input unit 119. Subject shake correction is image blur correction for a subject when a panning shot is taken for the subject. Camera shake correction is image blur correction when a non-panning shot is taken. When an identified value of the mode information indicates a panning shot mode as the operation mode of the image pickup apparatus, the switch 106 provides an output signal of the subtractor 118 to an integrator 107 such that the subject shake correction is performed by driving the correction unit 112. As will be described later, the subtractor 118 subtracts the output of the angular velocity detection unit 102 from the subject angular velocity calculated from the vector of the subject. Therefore, in the panning shot mode, the μCOM 101 functions as a driving means which drives a correction means used to correct image blur occurring in a captured image on the basis of a shake detection signal indicating the shake applied to the image pickup apparatus and the vector of the subject. When the identified value of the mode information does not indicate the panning shot mode, the switch 106 provides the output of the focal length calculation unit 105 to the integrator 107 such that the camera shake correction is performed.

The μCOM 101 may determine whether or not the identified value of the mode information is the panning shot mode on the basis of whether or not the photographer has selected the panning shot mode prepared in a mode setting dial. Alternatively, the μCOM 101 may make the determination on the basis of a result of the comparison between outputs of the angular velocity detection unit 102 in the yaw direction and in the pitch direction. Specifically, when the output of the angular velocity detection unit 102 on one axis is greater than that of the angular velocity detection unit 102 on the other axis (for example, by 10 dps or more), the μCOM 101 may determine that the current state is a panning or tilting state and that the mode is the panning shot mode.

The integrator 107 has a function capable of changing frequency characteristics in an arbitrary frequency band. The integrator 107 integrates the output of the switch 106 and calculates the amount of driving of the correction unit 112. The subtractor 108 subtracts an output of an A/D converter 114 from an output of the integrator 107 and outputs the resulting output to a controller 109. The correction system position detection unit 113 detects a position of the correction unit 112 and outputs the detected position to the A/D converter 114. The A/D converter 114 performs analog to digital conversion of the position of the correction unit 112 output by the correction system position detection unit 113 and outputs the resulting signal.

The controller 109 has an amplifier for amplifying input data with a predetermined gain and a phase compensation filter. Difference data provided from the subtractor 108 is output to the pulse width modulation unit 110 after being subjected to signal processing by the amplifier and the phase compensation filter in the controller 109. The pulse width modulation unit 110 modulates the data received via the controller 109 into a waveform (i.e., a PWM waveform) of pulses with a changed duty ratio and provides the modulated data to the correction system drive unit 111.

The correction system drive unit 111 is a voice coil type motor that drives the correction unit 112. The correction unit 112 is driven by the correction system drive unit 111 to move in the direction perpendicular to the optical axis. The correction unit 112 is, for example, a shift lens, and optically corrects image blur by moving in the direction perpendicular to the optical axis to shift the optical axis. As a result, an image in which movement of a subject on an image capturing plane caused by shaking of the apparatus or the like has been corrected is formed on image capturing elements.

The correction system position detection unit 113 detects the amount of movement of the correction unit 112 in the direction perpendicular to the optical axis and provides a result of the detection to the subtractor 108 via the A/D converter 114. The correction system position detection unit 113 has a magnet and a Hall sensor provided at a position opposite the magnet.

A method of calculating a subject shake correction amount required to perform subject shake correction will now be described. The motion vector detection unit 115 detects motion vectors of an image on the basis of a luminance signal included in a current video signal generated by a signal processing unit (not shown) and a luminance signal included in a video signal of an immediately previous frame. That is, the motion vector detection unit 115 detects motion vectors between a plurality of captured images. Here, the μCOM 101 sets a vector detection region, which is a region for motion vector detection by the motion vector detection unit 115, according to the amount of movement or the ratio of movement, relative to a reference position, of an in-focus position detected by the focus detection unit 120 which is an in-focus position detection means. A method of setting the vector detection region according to the amount of movement or the ratio of movement of the in-focus position relative to the reference position will be described later. Motion vector data detected by the motion vector detection unit 115 is provided to the subject vector detection unit 116.

The subject vector detection unit 116 detects a subject motion vector from motion vectors in a screen detected by the motion vector detection unit 115 and separates the motion vectors into the subject motion vector (also referred to as a first motion vector) and a background motion vector (also referred to as a second motion vector). Specifically, the subject vector detection unit 116 converts an angular velocity obtained by removing direct current (DC) components from the output of the angular velocity detection unit 102 into the amount of image plane movement on the image capturing plane (also referred to as an image plane movement amount). The subject vector detection unit 116 detects the subject motion vector on the basis of the motion vectors in the screen and the image plane movement amount.

The subject angular velocity calculation unit 117 converts the subject vector output by the subject vector detection unit 116 into a subject angular velocity on the basis of the focal length of the focus detection unit 120 or the frame rate thereof. The subtractor 118 subtracts the angular velocity detected by the angular velocity detection unit 102 from the subject angular velocity calculated by the subject angular velocity calculation unit 117, that is, calculates the difference in angular velocity between the subject and the camera and provides the difference to the switch 106.

Figure 2A:
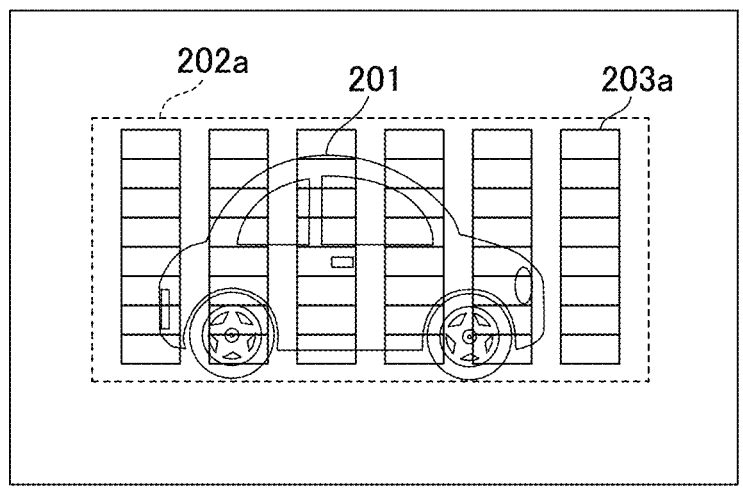
FIGS. 2A and 2B are diagrams showing an exemplary arrangement of vector detection blocks.
Figure 2B:
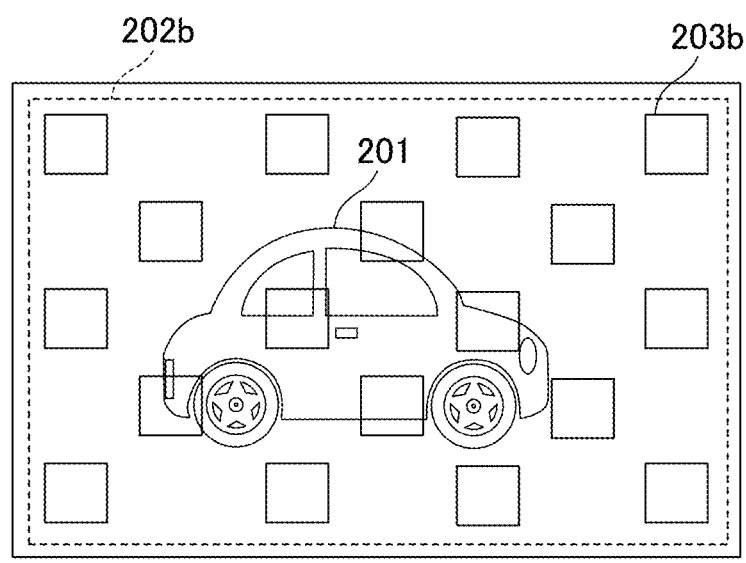

FIGS. 2A and 2B are diagrams showing an exemplary arrangement of vector detection blocks.

The vector detection blocks are blocks (image regions) for motion vector detection by the motion vector detection unit 115. FIG. 2A shows an exemplary arrangement of vector detection blocks when a panning shot is taken. FIG. 2B shows an exemplary arrangement of vector detection blocks when a video shot, rather than a panning shot, is taken. When prevention of shaking of the entire screen is desired, such as when a video shot is taken, vector detection blocks 203b are arranged such that a vector detection region 202b spans the entire screen. When prevention of shaking of a part of the screen rather than the entire screen is desired, such as when a panning shot is taken, the vector detection region 202a is arranged densely at a location where prevention of shaking is desired. That is, when prevention of shaking of a part of the screen rather than the entire screen is desired, such as when a panning shot is taken, vector detection blocks are arranged within a narrower range than when prevention of shaking of the entire screen is desired, such as when a video shot is taken. Here, by arranging a plurality of vector detection blocks (image regions) such that at least two of the plurality of vector detection blocks are adjacent to each other, it is possible to arrange the plurality of vector detection blocks more densely. When prevention of shaking of the entire screen is desired, such as when a video shot is taken, the vector detection blocks 203b are arranged such that the vector detection region 202b spans the entire screen and therefore the positions of the vector detection blocks do not change even when the position of the subject has changed. However, if the vector detection region 202b is arranged near the center of the screen, vector detection of the subject 201 is not possible when the subject 201 is located at an edge of the screen, that is, when the subject 201 is not within the vector detection region 202b.

Figure 3A:
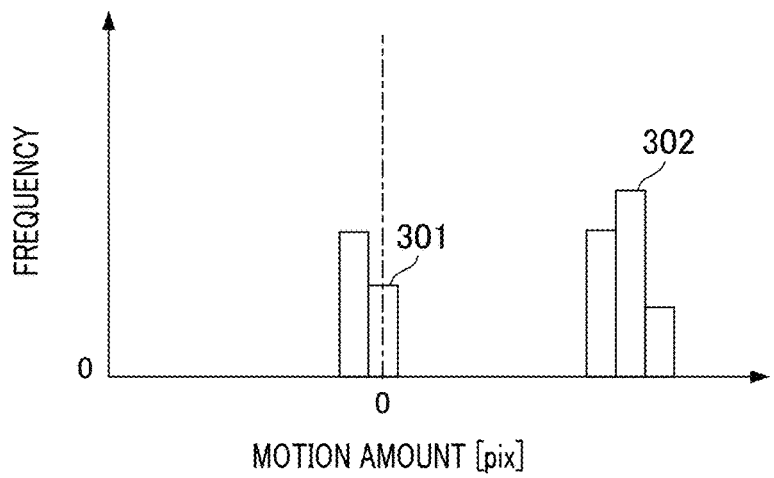
FIGS. 3A and 3B are diagrams showing exemplary histograms of motion vectors.
Figure 3B:
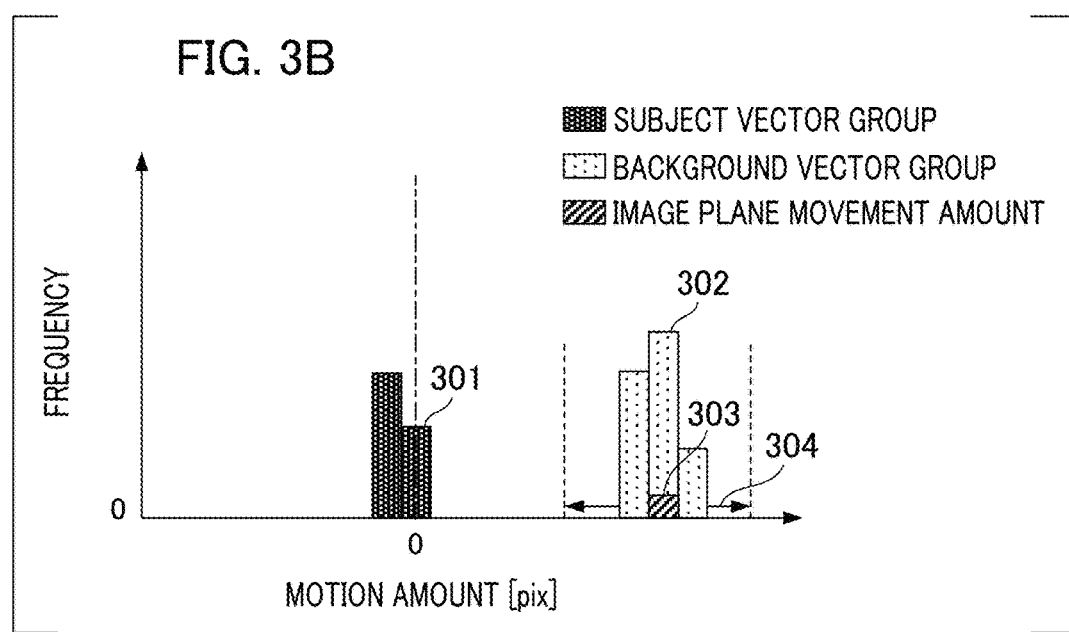

FIGS. 3A and 3B are diagrams showing exemplary histograms of motion vectors obtained using vector detection blocks.

A horizontal axis of FIG. 3A represents the amount of movement of each detected vector. A vertical axis represents the frequency. As shown in FIG. 2A, when only one subject is present in a screen, the histogram is largely divided into two vector groups such as a first vector group 301 and a second vector group 302. As an example of a method of determining subject vectors from a histogram, it is possible to determine that the first vector group 301, of which the amounts of movements are near 0 pixel, is a vector group of the subject and that the second vector group 302, of which the amounts of movement are equal to or greater than a certain distance from 0 pixel, is a vector group of a background. However, the vectors of which the amounts of movement are near 0 pixel are those detected when the photographer can successfully follow the subject. For photographers who are unfamiliar with panning shots, the difference in angular velocity between the subject and the camera will increase such that the first vector group 301 moves away from 0 pixel. This makes it difficult to determine whether each of the first vector group 301 and the second vector group 302 is the subject vector group or the background vector group.

As shown in FIG. 3B, the μCOM 101 determines that vectors present within a threshold background range 304 centered at an image plane movement amount 303 obtained by converting the angular velocity output by the angular velocity detection unit 102 are candidates for background vectors. The μCOM 101 also determines that vectors present outside the threshold background range 304 are candidates for subject vectors. The reason why the threshold background range 304 centered at the image plane movement amount 303 is used is as follows. The image plane movement amount 303 is the amount of movement of the image plane due to movement of the image pickup apparatus, which corresponds to the vector of a stationary subject. On the other hand, the number of vectors output by the motion vector detection unit 115 is 60 (corresponding to, for example, 6 lines in the vertical direction and 10 lines in the horizontal direction) in one frame, while the number of data items of the angular velocity output by the angular velocity detection unit 102 is 1 in one frame. Since vectors output by the motion vector detection unit 115 have a slight variation even when they are vectors of a stationary subject, the accuracy of determination of background vectors is not good if it is determined that only vectors having the same amount of movement as the image plane movement amount 303 are background vectors. For example, if it is determined that only the central vector among those of the amounts of movement set as the background vector group in FIG. 3B is a background vector, there is a possibility of erroneously determining that the other vectors of the background vector group are subject vectors. Therefore, in order to improve the accuracy of determination of background vectors, the threshold background range 304 centered at the image plane movement amount 303 is used. The threshold background range 304 varies according to the output of the angular velocity detection unit 102.

Figure 4:
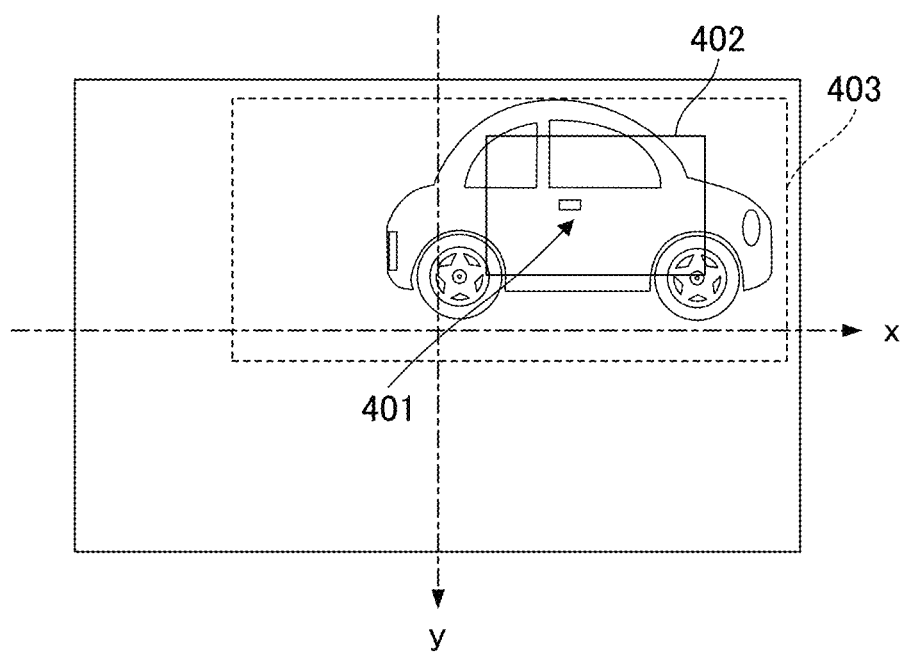
FIG. 4 is a diagram illustrating movement of a vector detection region.

FIG. 4 is a diagram illustrating movement of a vector detection region in the present embodiment.

As shown in FIG. 4, the μCOM 101 moves a vector detection region 403 in conjunction with a focus frame 402 of the camera. The focus frame indicates a focus detection region. The reason why the movement of the vector detection region is based on the focus frame 402 is that the photographer highly likely matches the focus frame 402 with a main subject. The μCOM 101 obtains a position at which the focus frame 402 is in focus, calculates the amount of movement or the ratio of movement of the position relative to the reference position 401, and sets the vector detection region 403 on the basis of a result of the calculation.

Figure 5:
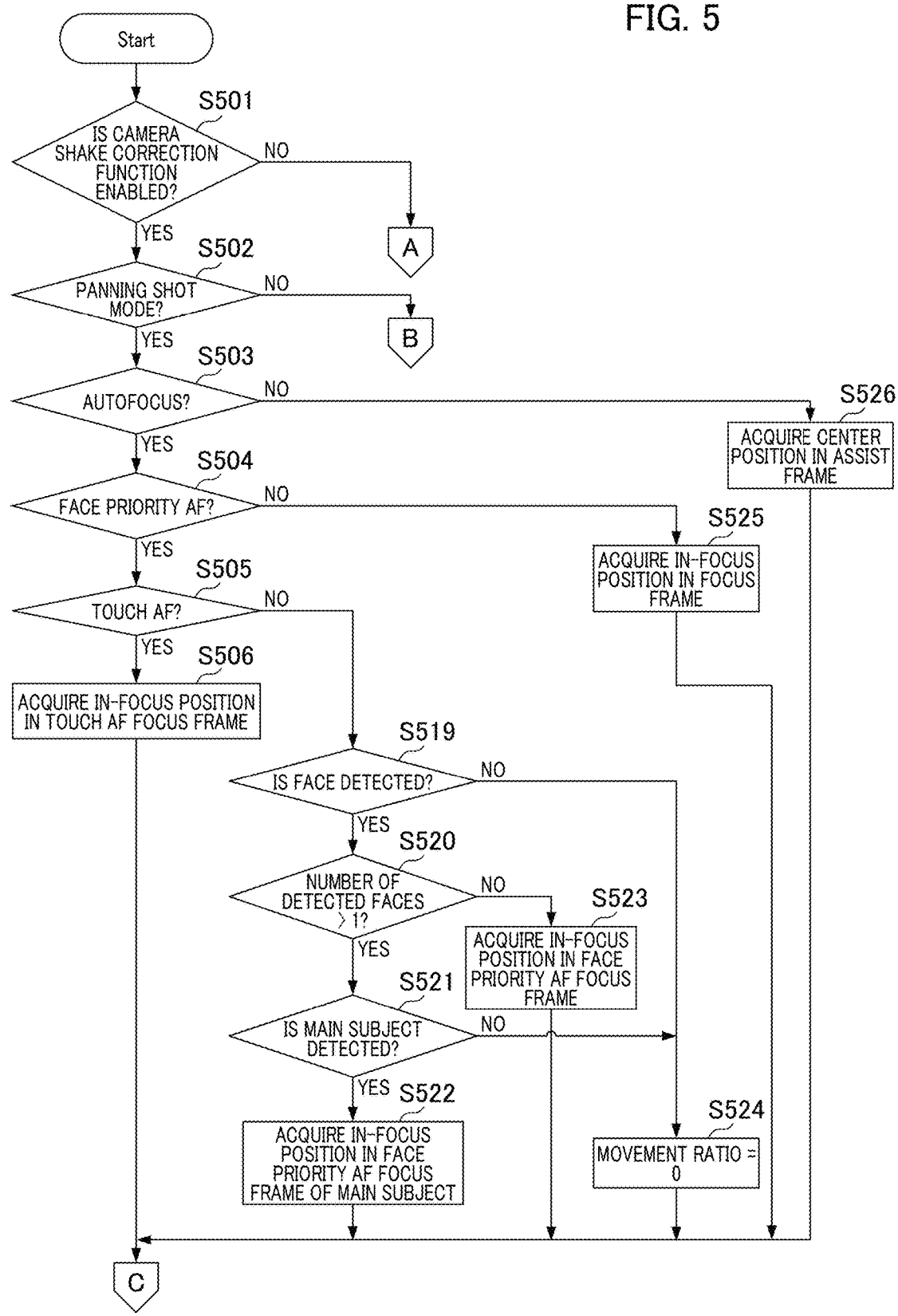
FIG. 5 is a flowchart illustrating an anti-shake control process.
Figure 6:
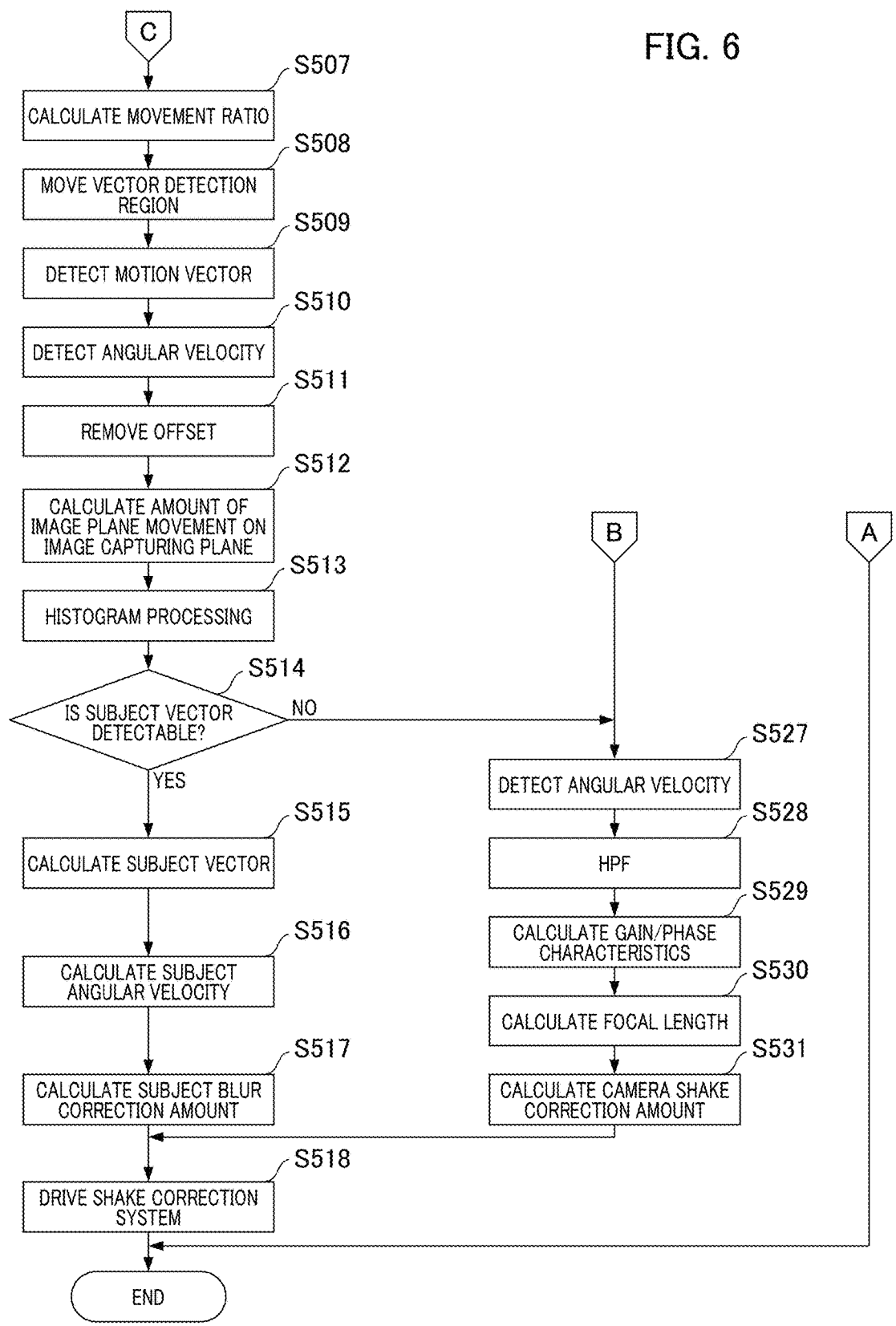
FIG. 6 is a flowchart illustrating the anti-shake control process.

FIGS. 5 and 6 are flowcharts illustrating an anti-shake control process according to the present embodiment.

In step S501, the μCOM 101 determines whether or not the camera shake correction function is enabled. When the camera shake correction function is enabled, the process proceeds to step S502. When the camera shake correction function is disabled, the μCOM 101 keeps the correction unit 112 at the optical center position and does not perform anti-shake control.

In step S502, the μCOM 101 determines whether or not the operation mode of the image pickup apparatus is the panning shot mode. When the operation mode of the image pickup apparatus is the panning shot mode, the processing proceeds to step S503. When the operation mode of the image pickup apparatus is not the panning shot mode, the process proceeds to step S527. The following is a description of an example of the method of determining whether or not the operation mode is the panning shot mode. For example, when the mode setting dial is selected to be the panning shot mode, the μCOM 101 determines that the operation mode is the panning shot mode. Alternatively, when the angular velocity which is the output of the angular velocity detection unit 102 is equal to or greater than a predetermined value, the μCOM 101 determines that the operation mode is the panning shot mode under the assumption that panning (or tilting) is being performed.

In step S503, the μCOM 101 determines whether the focus detection method is an autofocus method (AF) or a manual focus method (MF). When the focus detection method is the AF, the process proceeds to step S504. When the focus detection method is the MF, the process proceeds to step S526.

In step S504, the μCOM 101 determines whether or not the autofocus method is a face priority AF. The face priority AF is an autofocus method in which a focus detection process is performed on a captured image with priority given to the face of a subject in the captured image. When the autofocus method is the face priority AF, the processing proceeds to step S505. When the autofocus method is not the face priority AF, the process proceeds to step S525.

In step S505, the μCOM 101 determines whether or not a touch AF is being performed. The touch AF is an autofocus method in which a focus detection process is performed on a subject selected by a user operation. In this example, in the touch AF, an area touched by the user is set as a target of the focus detection process. When the touch AF is performed, the process proceeds to step S506. When the touch AF is not performed, the process proceeds to step S519. In step S506, the μCOM 101 acquires, as a target position of focus control, an in-focus position within an area in which the touch AF has been performed, that is, an in-focus position detected in a focus detection region corresponding to the subject selected by the user. Then, the process proceeds to step S507 in FIG. 6.

Figure 7A:
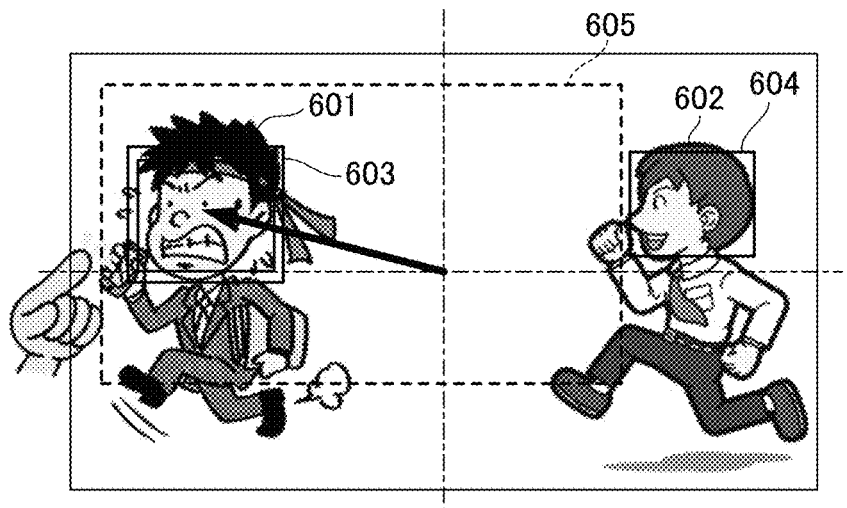
FIGS. 7A to 7C are diagrams illustrating movement of a vector detection region.
Figure 7B:
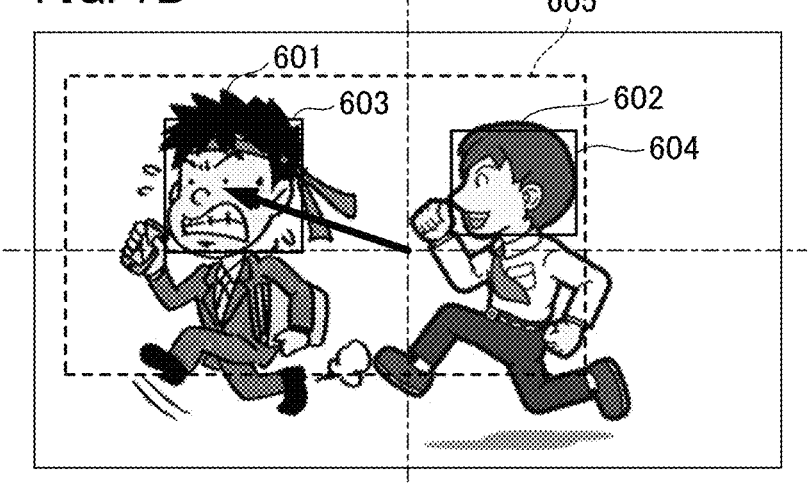
Figure 7C:
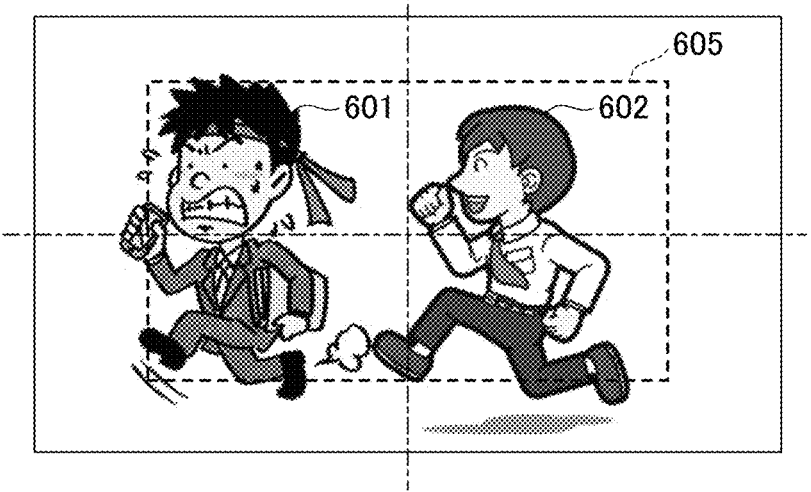

FIGS. 7A to 7C are diagrams illustrating movement of a vector detection region in the case where a plurality of subjects are present in the screen.

As shown in FIG. 7A, a plurality of subjects are present within the angle of view. A focus frame 604 corresponds to a subject 602. A focus frame 603 corresponds to a subject 601. Reference numeral 605 denotes a vector detection region. The μCOM 101 acquires an in-focus position of the focus frame 603 displayed on the subject 601 specified by a photographer with touch AF.

In step S507 of FIG. 6, the μCOM 101 calculates the amount of movement or the ratio of movement of the in-focus position relative to a reference position (for example, a center position in the angle of view). This in-focus position is acquired in any one of steps S506, S522, S523, and S525 of FIG. 5. Further, when a center position of a region within an assist frame is acquired in step S526 of FIG. 5 which will be described later, the μCOM 101 calculates the amount of movement or the ratio of movement of the center position relative to the reference position.

Next, in step S508 of FIG. 6, the μCOM 101 moves the vector detection region on the basis of the value of the amount of movement or the ratio of movement calculated in step S507. Subsequently, in step S509, the motion vector detection unit 115 detects motion vectors in the vector detection region moved in step S508.

Next, in step S510, the μCOM 101 acquires an average value of the angular velocities of an exposure center of gravity, which is the output of the angular velocity detection unit 102. The motion vector detection unit 115 detects a vector difference between frames at the exposure center of gravity of image capturing, which is to achieve synchronization when creating, in step S513, histograms of an image plane movement amount calculated from the output of the angular velocity detection unit 102 and the output of the motion vector detection unit 115.

Next, in step S511, the μCOM 101 removes an offset component from the average value of the angular velocities of the exposure center of gravity obtained in step S510. The offset component is removed to prevent a subject vector from being erroneously detected due to an offset of the image plane movement amount calculated by converting the angular velocity by the same amount as the superimposed offset in the subject motion vector calculation process which will be described later. Subsequently, in step S512, the μCOM 101 converts the average value of the angular velocities of the exposure center of gravity into the amount of image plane movement on an image capturing plane on the basis of the frame rate and the focal length information. The reason for converting the angular velocity information into the image plane movement amount is to use the image plane movement amount obtained from the angular velocity in the subject motion vector determination process which will be described later.

In step S513, the μCOM 101 creates a histogram from motion vectors detected in step S509. For example, when the number of detection blocks for use by the motion vector detection unit 115 is set to 6 vertical lines multiplied by 10 horizontal lines, a histogram corresponding to a total of 60 pieces of vector data is created. The μCOM 101 also creates a histogram from the amount of image plane movement on the image capturing plane calculated in step S512. Specifically, since the angular velocity acquired in one frame is a single piece of data, the μCOM 101 uses a range of $\pm\alpha$ as a threshold background range centered at the amount of image plane movement on the image capturing plane calculated by converting the angular velocity to create a histogram of the image plane movement amount. In the present embodiment, since the angular velocity acquired in one frame is a single piece of data, the μCOM 101 may set the range of $\pm\alpha$ from the image plane movement amount as a range for determining background vectors without the need to create a histogram from the image plane movement amount.

In step S514, the μCOM 101 determines whether or not subject motion vectors can be detected. Specifically, in the histogram created in step S513, the μCOM 101 determines vectors in the threshold background range 304 as candidates for vectors of a background vector group and vectors outside the threshold background range 304 as candidates for vectors of a subject vector group. When the frequency of a peak vector in each vector group is equal to or greater than a threshold value (for example, 5), the μCOM 101 determines that motion vectors of each vector group can be correctly detected and finally detects the motion vectors as subject motion vectors and background motion vectors. When subject motion vectors can be detected, the process proceeds to step S515. When subject motion vectors cannot be detected, the process proceeds to step S527.

In step S515, the μCOM 101 calculates an average vector value of the subject vector group detected in step S514. Subsequently, in step S516, the μCOM 101 converts the average subject motion vector calculated in step S515 into an angular velocity on the basis of the focal length and the frame rate and sets the angular velocity as a subject angular velocity. In step S517, the μCOM 101 integrates the difference between the subject angular velocity calculated in step S516 and the output of the angular velocity detection unit 102 and calculates a correction signal used for subject shake correction.

In step S518, the μCOM 101 drives the correction unit 112. Specifically, upon determining in step S502 that the mode is the panning shot mode, the μCOM 101 drives the correction unit 112 on the basis of the correction signal for subject shake correction calculated in step S517. On the other hand, upon determining in step S502 that the mode is not the panning shot mode, the μCOM 101 drives the correction unit 112 on the basis of a correction signal for camera shake correction calculated in step S531 which will be described below.

On the other hand, in step S519 of FIG. 5, the μCOM 101 determines whether or not a face has been detected. When a face has been detected, the process proceeds to step S520. When no face has been detected, the process proceeds to step S524.

Next, in step S520, the μCOM 101 determines whether or not the number of detected faces is two or more. When the number of detected faces is two or more, the process proceeds to step S521. When the number of detected faces is 1, the process proceeds to step S523. The reason why the number of detected faces is determined in step S520 is that, since touch AF was not performed, it is necessary to determine which subject is a target of the panning shot when there are a plurality of subjects in the screen as shown in FIG. 7B.

Next, in step S521, the μCOM 101 determines whether or not a main subject can be detected. Since the μCOM 101 has determined in step S505 that no touch AF has been performed such that no main subject specifying operation has been performed by the photographer, the μCOM 101 performs automatic determination through the camera in step S521. For example, the μCOM 101 determines whether or not a main subject can be detected by specifying the size of the face or by determining whether or not the face is detected at a position near the center of the angle of view. When a main subject can be detected, the process proceeds to step S522. When no main subject can be detected, the process proceeds to step S524.

In step S522, as shown in FIG. 7B, the subject 601 is detected as a main subject from the plurality of subjects 601 and 602 in the screen. Therefore, the μCOM 101 acquires an in-focus position in a focus frame 603 corresponding to the face of the main subject 601 as a target position of focus control. Then, the process proceeds to step S507.

In step S523, since the number of subjects in the screen is 1 and a face can be detected, the μCOM 101 acquires an in-focus position detected within a focus detection region (within a focus frame) corresponding to the face of the subject as a target position of focus control. Then, the process proceeds to step S507.

In step S524, as shown in FIG. 7C, no main subject has been determined by the camera although the plurality of subjects 601 and 602 are present in the screen or no face has been detected in step S519. This is because a subject (for example, a train) other than a person on the screen has been captured or there is no subject in the screen. Therefore, the μCOM 101 sets the amount of movement or the ratio of movement to 0 and maintains the position of the vector detection region 605, for example, at the center of the screen.

In step S525, an auto focus method other than face priority AF has been set. Therefore, for example, when a method of focusing on a point in a specified focus frame has been set, the μCOM 101 acquires an in-focus position of the specified focus frame as a target position of focus control. Then, the process proceeds to step S507.

In step S526, a manual focus method has been set. Here, at the time of manual focusing, the μCOM 101 displays a frame (an assist frame) different from a frame displayed at the time of autofocusing. The assist frame is a frame for assisting image capturing, more specifically, a frame facilitating the photographer to focus on a position in the subject which the photographer desires to freeze. Accordingly, the μCOM 101 acquires the center position of the region within the assist frame as the target position of focus control. Then, the process proceeds to step S507.

On the other hand, in step S527, the μCOM 101 acquires the angular velocity output by the angular velocity detection unit 102. In step S528, since DC components are superimposed on the output of the angular velocity detection unit 102, the μCOM 101 removes the DC components through a high pass filter. Subsequently, in step S529, the μCOM 101 calculates gain and phase characteristics through an amplifier which amplifies input data with a predetermined gain and a phase compensation filter such that the output of the angular velocity detection unit 102 from which DC components have been removed has desired frequency characteristics.

In step S530, the μCOM 101 calculates a focal length of the image capturing optical system and corrects the output of the gain/phase characteristics calculation unit 104 so that the output has optimal values for driving the correction unit 112. Then, in step S531, the μCOM 101 integrates the output corrected in step S530 to calculate a correction signal for camera shake correction. Then, the process proceeds to step S518.

As described above, the μCOM 101 moves the vector detection region in conjunction with the focus frame and therefore it is possible to detect vectors at any position in the screen. The present invention is not limited to an image blur correction device of a digital single lens reflex camera or a digital compact camera and can also be applied to an image capturing device such as a surveillance camera, a web camera, or a mobile phone. Further, although the above embodiment has been described with reference to an example in which motion vectors are used as motion information of a subject or a background in a screen, motion information which separately includes the amount of movement and the direction of movement may also be used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-167908, filed Aug. 30, 2016, which is hereby incorporated by reference herein in its entirety.

What is claimed is:

1. An image pickup apparatus comprising:
a memory; and
a processor configured to function, based on a program stored in the memory, as units comprising:
(1) a detection unit configured to detect a motion vector between a plurality of captured images, a result of detection by the detection unit being used for image blur correction;
(2) a first setting unit configured to set positions of a plurality of image regions used for motion vector detection by the detection unit; and
(3) a second setting unit configured to set a target position of focus control,
wherein the first setting unit sets the positions of the plurality of image regions whether the image pickup apparatus is in a first image blur correction mode or a second image blur correction mode,
wherein, if the image pickup apparatus is in the first image blur correction mode, the first setting unit sets the positions of the plurality of image regions to be denser than if the image pickup apparatus is in the second image blur correction mode, and
wherein the first setting unit sets the positions of the plurality of image regions according to the target position set by the second setting unit if the image pickup apparatus is in the first image blur correction mode.

2. The image pickup apparatus according to claim 1, wherein the first image blur correction mode is used when a panning shot is taken.

3. The image pickup apparatus according to claim 1, wherein the first setting unit changes the positions of the plurality of image regions when the target position set by the second setting unit has changed if the image pickup apparatus is in the first image blur correction mode.

4. The image pickup apparatus according to claim 1, wherein the first setting unit does not change the positions of the plurality of image regions even when the target position set by the second setting unit has changed if the image pickup apparatus is in the second image blur correction mode.

5. The image pickup apparatus according to claim 1, wherein the processor is configured to further function as a face detection unit configured to detect a face area of a subject on the basis of an captured image, and
wherein the second setting unit sets the target position on the basis of a position of the face area of the subject detected by the face detection unit.

6. The image pickup apparatus according to claim 1, wherein the second setting unit sets the target position on the basis of a position of a frame displayed for assisting image capturing of a subject if a focus detection method of the image pickup apparatus is not an autofocus method.

7. The image pickup apparatus according to claim 1, wherein the processor is configured to further function as a correction unit configured to perform image blur correction by moving a lens on the basis of the motion vector detected by the detection unit.

8. The image pickup apparatus according to claim 1, wherein the second setting unit sets the positions of the plurality of image regions such that the target position is a center of the plurality of image regions.

9. The image pickup apparatus according to claim 1, wherein, if the image pickup apparatus is in the first image blur correction mode, the positions of the plurality of image regions are set within a narrower range than if the image pickup apparatus is in the second image blur correction mode.

10. The image pickup apparatus according to claim 1, wherein the first setting unit sets at least two of the plurality of image regions to be adjacent to each other if the image pickup apparatus is in the first image blur correction mode.

11. The image pickup apparatus according to claim 1, wherein the processor is configured to further function as a face detection unit configured to detect a face area of a subject on the basis of a captured image, and
wherein the second setting unit sets the target position at the center of the screen when the face detection unit does not detect a face area of the subject.

12. The image pickup apparatus according to claim 1, wherein the first setting unit is configured to set the positions of the plurality of image regions such that the target position is within a vector detection region, which is a region including the plurality of image regions.

13. A motion vector detection method comprising:
detecting a motion vector between a plurality of captured images;
setting positions of a plurality of image regions used for detecting the motion vector, wherein the setting is carried out whether an image pickup apparatus is in a first image blur correction mode or a second image blur correction mode; and
setting a target position of focus control,
wherein in the setting of the positions of the plurality of image regions, if the image pickup apparatus is in the first image blur correction mode, the positions of the plurality of image regions are set to be denser than if the image pickup apparatus is in the second image blur correction mode, and
wherein in the setting of the positions of the plurality of image regions, the positions of the plurality of image regions are set according to the target position if the image pickup apparatus is in the first image blur correction mode.

* * * * *